(12) United States Patent
Anderson

(10) Patent No.: US 6,623,678 B2
(45) Date of Patent: Sep. 23, 2003

(54) METHOD OF MAKING A PROTOTYPE GOLF CLUB GRIP

(75) Inventor: Douglas W. Anderson, Glendale, AZ (US)

(73) Assignee: Karsten Manufacturing Corp., Phoenix, AZ (US)

( * ) Notice: Subject to any disclaimer, the term of this patent is extended or adjusted under 35 U.S.C. 154(b) by 395 days.

(21) Appl. No.: 09/773,088

(22) Filed: Jan. 31, 2001

(65) Prior Publication Data

US 2002/0101001 A1 Aug. 1, 2002

(51) Int. Cl.[7] .............................................. B29C 39/02
(52) U.S. Cl. ...................... 264/162; 264/232; 264/296; 264/319; 249/95; 249/96; 29/527.1
(58) Field of Search ................................. 264/162, 294, 264/232, 319, 296, 340, 130; 249/95, 96; 29/527.1

(56) References Cited

U.S. PATENT DOCUMENTS

| | | | | |
|---|---|---|---|---|
| 5,261,665 A | * | 11/1993 | Downey | 473/303 |
| 5,293,766 A | * | 3/1994 | Chang | 72/283 |
| 5,529,733 A | * | 6/1996 | Lee | 264/73 |
| 5,571,050 A | * | 11/1996 | Huang | 473/300 |
| 5,716,566 A | * | 2/1998 | Lee | 264/73 |
| D414,233 S | | 9/1999 | Anderson | |
| D431,851 S | | 10/2000 | Anderson | |
| 6,143,228 A | * | 11/2000 | Jones | 264/295 |

FOREIGN PATENT DOCUMENTS

JP     58074329 A  *  5/1983

* cited by examiner

*Primary Examiner*—Edmund H. Lee
(74) *Attorney, Agent, or Firm*—Darrell F. Marquette

(57) ABSTRACT

A method of making a prototype golf club grip includes the steps of providing a two-piece mold having a main chamber and a pair of blind bores extending from opposed ends of the main chamber, providing a mandril having an intermediate section and opposite ends, placing the mandril in the two-piece mold with its intermediate section in the main chamber thereof and its opposite ends in the blind bores of the two-piece mold, pouring polymeric material such as epoxy into the main chamber of the two-piece mold, curing the polymeric material to form a grip blank on the intermediate section of the mandril, removing the mandril and the grip blank from the two-piece mold, and machining the grip blank to form a desired shape and features thereon to complete the prototype golf club grip.

11 Claims, 3 Drawing Sheets

METHOD OF MAKING A PROTOTYPE GOLF CLUB GRIP

BACKGROUND OF THE INVENTION

This invention relates generally to golf equipment and, in particular, to a method of making a prototype golf club grip.

When a golf club grip such as disclosed in U.S. Pat. Nos. D414,233 and D431,851 to D. W. Anderson is designed, a model (i.e. a prototype) is usually made so that the visual impression and the feel of the grip may be evaluated prior to spending the time and money required to make a master and a mold for mass production of the grip. The conventional method of making a prototype golf club grip is to start with a cylindrical aluminum bar in a lathe and then turn down the opposite ends of the aluminum bar to form a pair of oppositely extending bosses by which the aluminum bar is held during subsequent machining operations. A lathe cannot be used to accomplish these subsequent machining operations because machining of a prototype golf club grip is a very complex operation due to the shape of the grip and this machining is performed on a multi-axis milling machine. Due to the nature of aluminum and multi-axis milling machines, cutting the cylindrical aluminum bar into the desired shape while also cutting the grooves and other design features into the surface of the aluminum bar must be done very slowly, or the cutting tools will be ruined. In addition, when graphics such as a trademark, logo or other designs are incorporated into the grip, the time required and the difficulty associated with machining such graphics makes it impractical to apply them on a prototype grip prior to evaluation of the design. Therefore, visual evaluation of grip aesthetics is usually made on a grip prototype which lacks graphics.

Furthermore, if a mistake is made during machining of an aluminum prototype golf club grip or a design change is desired during the machining operations, the entire process must be started over again since it is virtually impossible to repair or make design changes in an aluminum prototype grip. The reason for this is that a damaged prototype grip, or one that is to be modified, cannot be welded while on the milling machine and once removed from the milling machine, it is virtually impossible to return it to the milling machine in the precise location required to avoid misalignment of the various design features on the grip.

SUMMARY OF THE INVENTION

In accordance with the present invention, a method of making a prototype golf club grip is disclosed. The method of the present invention includes a step of providing a two-piece mold which has a main chamber and a pair of blind bores at opposed ends of the main chamber. A slot extends laterally from the main chamber through one side of the two-piece mold. Another step includes providing a mandril, and a further step is placing the mandril in the two-piece mold so that an intermediate section thereof lies in the main chamber and opposite ends of the mandril are disposed in the blind bores of the two-piece mold. Another step of the method is pouring polymeric material such as epoxy into the main chamber defined in the two-piece mold through the slot formed through one side of the mold. A further method step is curing the polymeric material to form a grip blank on the intermediate section of the mandril with the opposite ends of the mandril extending from the grip blank and, after the mandril and the grip blank are removed from the mold, the final step of the method includes machining the grip blank into a desired shape for the prototype golf club grip.

Due to the ease of machining epoxy, the final step of the above-described method may be quickly and easily accomplished and graphics may be included in the machining operation. In addition, if mistakes are made, or design changes are desired during machining of the grip blank, the effected area or areas can be patched with polymeric material without removing it from the milling machine, thus avoiding misalignment problems. When the prototype golf club grip is no longer needed, it may be easily removed from the mandril so that the mandril, and the two-piece mold, may be reused.

DESCRIPTION OF THE PREFERRED EMBODIMENT

Figure 1:
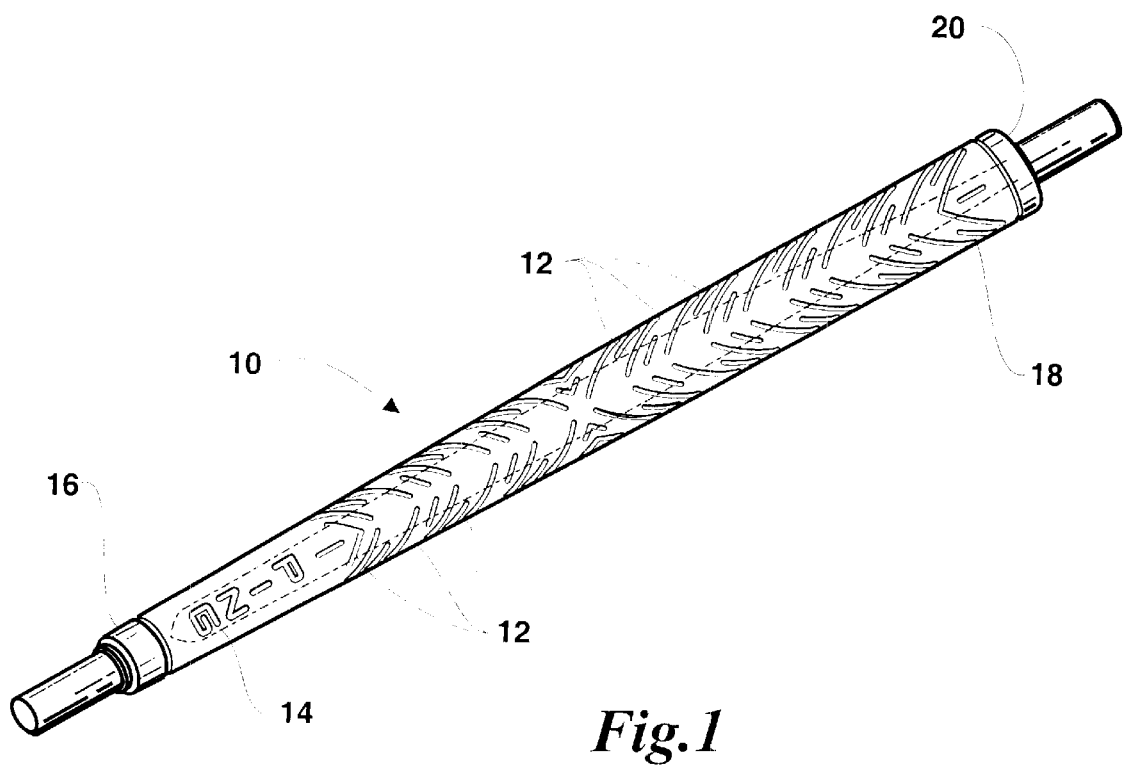
FIG. 1 is a perspective view of a prototype golf club grip made in accordance with the method of the present invention.

Referring to the drawings, FIG. 1 illustrates a model or prototype golf club grip made in accordance with the method of the present invention, with the prototype grip being indicated generally by the reference numeral 10. The prototype grip 10 is shown to have, for example, a particular design including an array of grooves 12 cut into its outer peripheral surface and is provided with graphics, such as the illustrated trademark PING at a first location 14 adjacent its reduced diameter end 16 and a second location 18 adjacent its opposite end 20.

Figure 2:
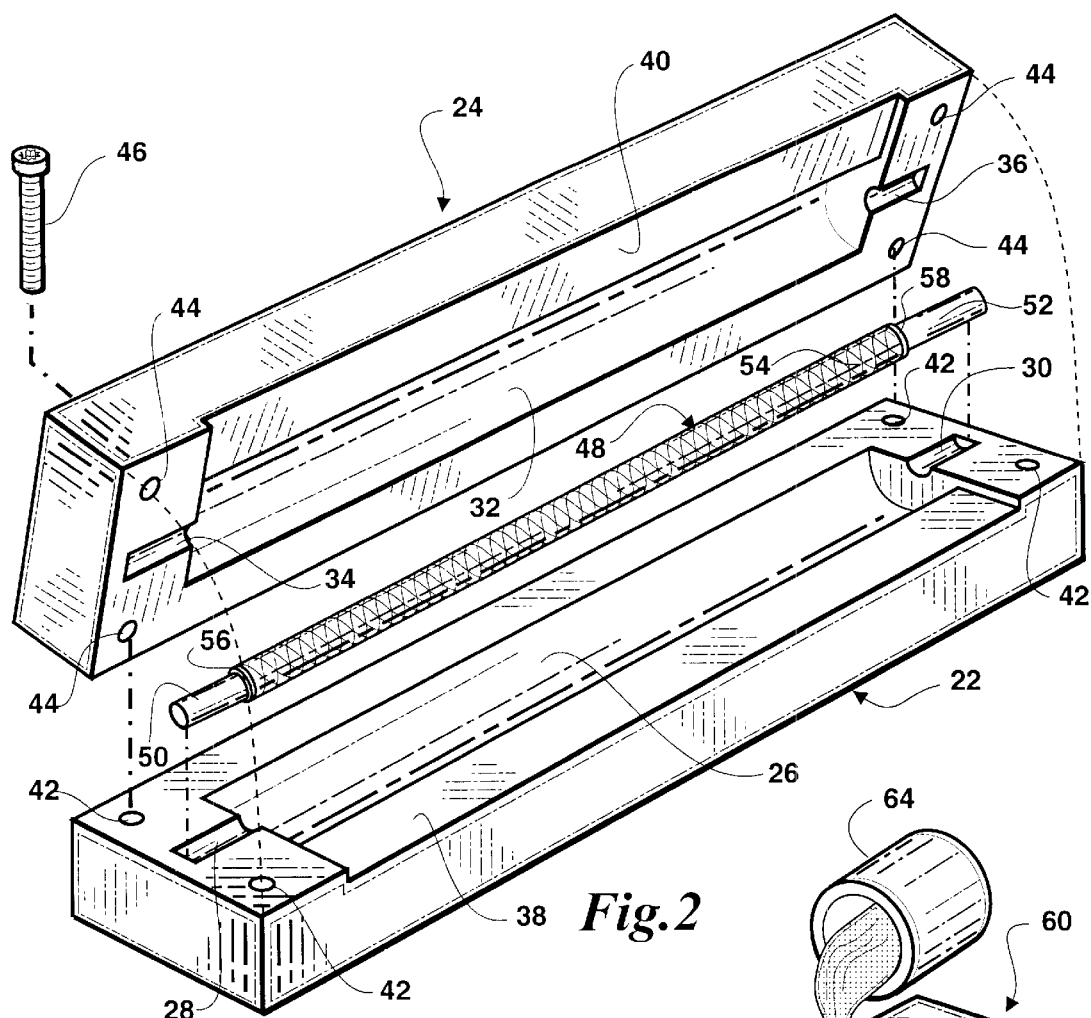
FIG. 2 is an exploded perspective view illustrating some initial steps of the method of the present invention.
Figure 3:
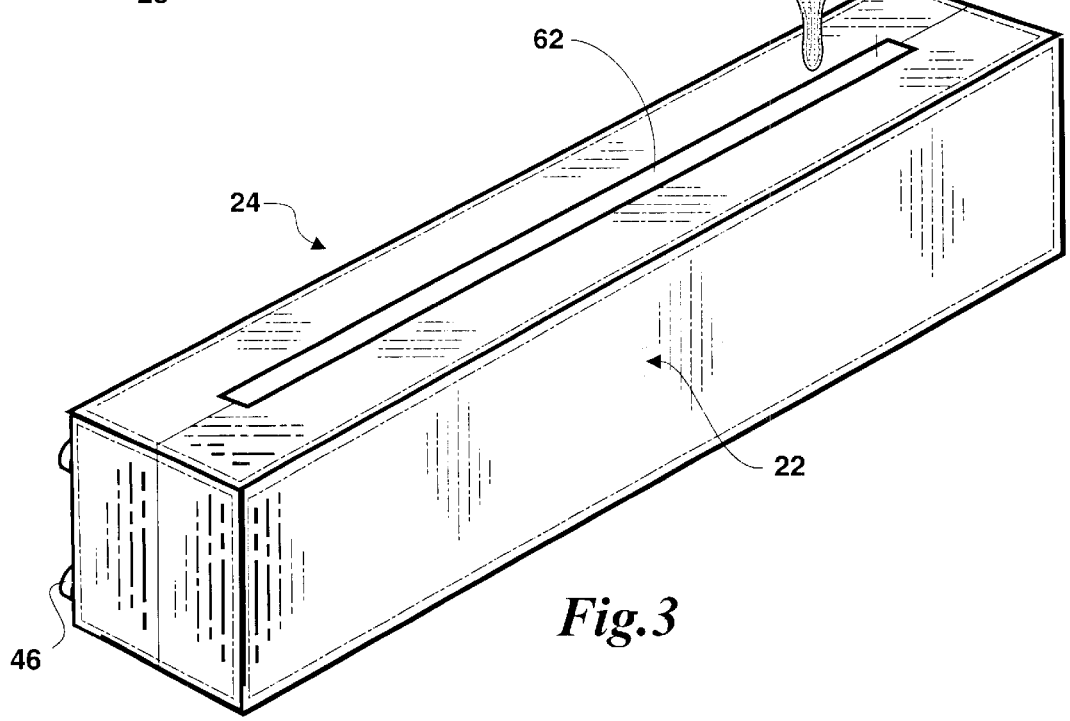
FIG. 3 is a perspective view illustrating some subsequent steps of the method of the present invention.
Figure 4:
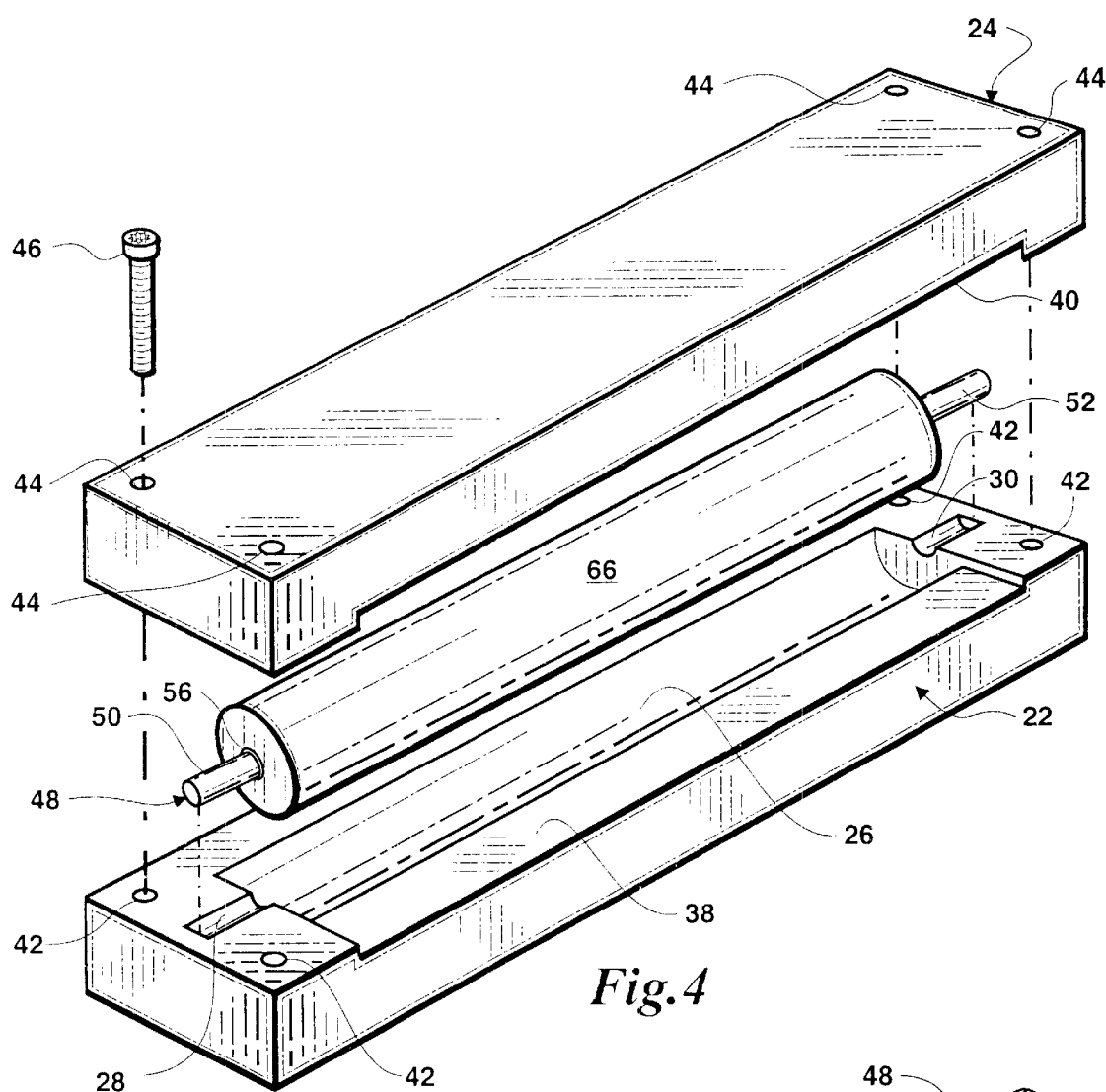
FIG. 4 is an exploded perspective view illustrating another step of the method of the present invention.

Referring now to FIG. 2, some initial steps of the method of making the prototype grip 10 are illustrated. One method step includes providing a two-piece mold 60 (FIG. 3) having a base member 22 and a cover member 24. The base member 22 is formed with a generally semi-cylindrical chamber 26 extending longitudinally thereof and a pair of generally semi-cylindrical blind bores 28, 30 extending from opposite ends of the chamber 26. Similarly, the cover member 24 is formed with a matching generally semi-cylindrical chamber 32 and a matching pair of generally semi-cylindrical blind bores 34, 36 extending from opposite ends of the chamber 32. The base member 22 is further provided with an elongated recess 38 which extends laterally from the chamber 26 through one side of the base member 22. The cover member 24 is provided with a matching elongated recess 40 which extends laterally from the chamber 32 through one side of the cover member 24. The base member 22 is provided with a threaded bore 42 at each corner and the cover member 24 is formed with aligned bores 44 at each corner. Suitable bolts 46 (only one of which is shown in FIGS. 2 and 4) are provided to hold the base and cover members 22, 24 together for subsequent method steps as described below.

Another method step is to provide an elongated cylindrical mandril 48 having opposite ends 50, 52 and an intermediate section 54 that is scored, with O-rings 56 and 58 separating the opposite ends 50 and 52, respectively, from the intermediate section 54. The mandril 48 is placed in the base member 22 so that its opposite ends 50 and 52 are disposed in the blind bores 28 and 30, respectively, and its intermediate section 54 lies in and extends axially through the semi-cylindrical chamber 26 thereof. When the mandril 48 is placed in the base member 22 in this manner, the O-rings 56 and 58 on the mandril 48 will be located at junctions of the chamber 26 and the semi-cylindrical bores 28 and 30, respectively. A further method step involves placing the cover member 24 on the base member 22 and inserting the bolts 46 through the bores 44 of the cover member 24 into threaded engagement with the bores 42 of the base member 22 to provide the assembled two-piece mold 60 seen in FIG. 3. When the base and cover members 22, 24 are assembled to form the two-piece mold 60, the recess 38 of the base member 22 and the recess 40 of the cover member 24 cooperate to form an elongated slot 62 which extends through one side of the two-piece mold 60. The O-rings 56, 58 seal the main chamber of the mold 60 that is defined by the semi-cylindrical chambers 26, 32 from a pair of blind bores in the mold 60 that are located at opposed ends of the main chamber and defined by the semi-cylindrical blind bores 28, 30, 34 and 36.

Another method step is accomplished by pouring suitable polymeric material 64 through the slot 62 into the main chamber of the two-piece mold 60. While other polymeric materials such as polyurethane may be used, epoxy is preferred because it is readily available, inexpensive and has excellent machining characteristics. Curing of the polymeric material 64 forms a grip blank 66 on the intermediate section 54 of the mandrel 48 and then the mandril 48 and the grip blank 66 are removed from the mold 60 when the base member 22 and the cover member 24 are disassembled as shown in FIG. 4. The opposite ends 50, 52 of the mandril 48 extend from the grip blank 66.

Figure 5:
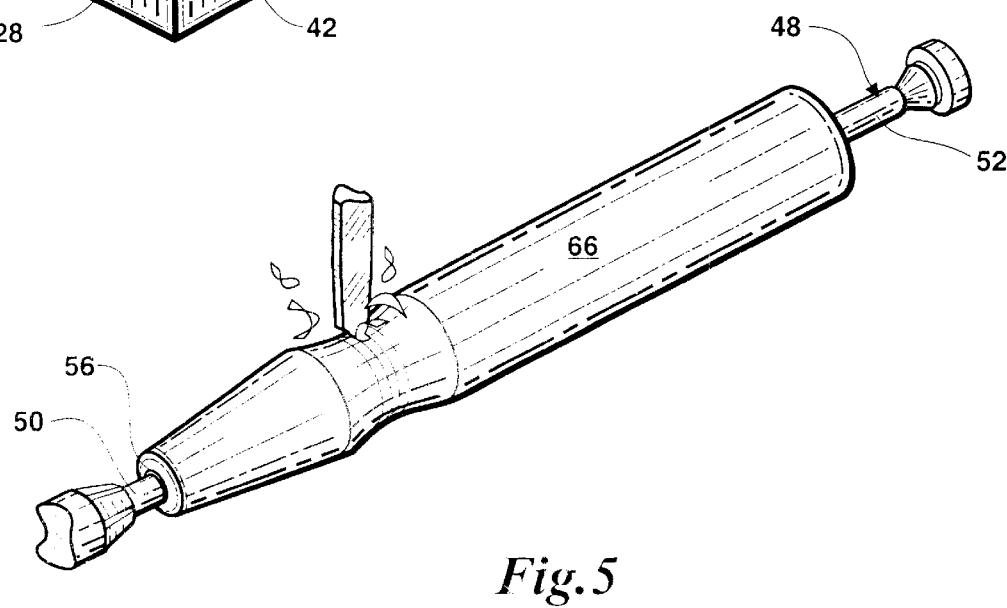
FIG. 5 is a perspective view illustrating a final step of the method of the present invention.

The final method step shown in FIG. 5 is machining of the grip blank 66 to form that blank 66 into a finished prototype golf club grip such as the prototype grip 10 shown in FIG. 1. This machining will be accomplished by using a multi-axis milling machine shown schematically.

What is claimed is:

1. A method of making a prototype golf club grip comprising the steps of:
   providing a two-piece mold having a main chamber and a pair of blind bores at opposed ends of the main chamber;
   providing a mandril having an intermediate section and opposite ends;
   placing said mandril in said two-piece mold so that said intermediate section lies in the main chamber thereof and said opposite ends are disposed in the blind bores thereof;
   pouring polymeric material into the main chamber of said two-piece mold;
   curing said polymeric material to form a grip blank on the intermediate section of said mandril;
   removing said mandril and said grip blank from said two-piece mold; and
   machining said grip blank to form a desired shape and features thereon to complete the prototype golf club grip.

2. The method of claim 1, wherein said two piece mold is provided with a slot which extends from the main chamber thereof through one side of said two-piece mold so that said polymeric material is poured into the main chamber of said two-piece mold through said slot.

3. The method of claim 1, wherein said two-piece mold comprises:
   a base member having a generally semi-cylindrical chamber formed therein which defines one half of the main chamber of said two-piece mold and having a pair of generally semi-cylindrical blind bores extending from opposite ends of said semi-cylindrical chamber to form one half of said pair of blind bores of said two-piece mold; and
   a cover member having a generally semi-cylindrical chamber formed therein which defines the other half of the main chamber of said two-piece mold and having a pair of generally semi-cylindrical blind bores extending from opposite ends of said semi-cylindrical chamber thereof to form the other half of said pair of blind bores of said two-piece mold.

4. The method of claim 3, further comprising means formed in said base member and in said cover member for holding said base member and said cover member together to form said two-piece mold.

5. The method of claim 1, wherein said mandril is cylindrical and the intermediate section thereof is scored.

6. The method of claim 5, wherein said mandril has a pair of O-rings located at opposed ends of the intermediate section thereof to form a seal between the main chamber of said two-piece mold and the blind bores thereof when said mandril is placed in said two-piece mold.

7. The method of claim 5, wherein said mandril further includes a first O-ring located at a junction of the intermediate section and one of the opposite ends of said mandril, and a second O-ring at a junction of the intermediate section and the other opposite end of said mandril.

8. The method of claim 1, wherein said polymeric material is epoxy.

9. A method of making a prototype golf club grip comprising the steps of:
   providing a base member having a generally semi-cylindrical chamber formed therein and having a pair of generally semi-cylindrical blind bores extending from opposite ends of said semicylindrical chamber, said base member having an elongated recess extending laterally from said semi-cylindrical chamber through one side thereof;
   providing a cover member having a generally semi-cylindrical chamber formed therein which matches the semi-cylindrical chamber of said base member and having a pair of generally semi-cylindrical blind bores extending from opposite ends of the semi-cylindrical chamber thereof with the semi-cylindrical blind bores of said cover member matching the semi-cylindrical blind bores in said base member, said cover member having an elongated recess which matches the elongated recess in said base member and which extends laterally from the semi-cylindrical chamber through one side of said cover member;
   providing an elongated mandril having an intermediate section and opposite ends;
   placing said mandril in said base member so that said intermediate section lies in the semi-cylindrical chamber thereof and said opposite ends are disposed in the semi-cylindrical blind bores thereof;
   assembling said cover member on said base member to form a two-piece mold having a main chamber defined by said semi-cylindrical chambers in said base member and said cover member, a pair of blind bores at opposed ends of the main chamber defined by said semicylindrical blind bores in said base member and said cover member, and an elongated slot defined by the elongated recesses in said base member and said cover member;

pouring polymeric material into the main chamber of said two-piece mold;

curing said polymeric material to form a grip blank on the intermediate section of said mandril so that the opposite ends of said mandril extend from said grip blank;

disassembling said cover member from said base member;

removing said mandril and said grip blank from said base member; and machining said grip blank to form a desired shape and features thereon to complete the prototype golf club grip.

10. The method of claim 9, wherein said polymeric material is epoxy.

11. The method of claim 9, wherein the intermediate section of said mandril is scored, and wherein a pair of O-rings located at opposed ends of the intermediate section thereof form a seal between the main chamber of said two-piece mold and the blind bores thereof when said mandril is placed in said base member and said cover member is assembled thereto to form said two piece mold.

* * * * *